C. H. WILLIAMS.
RELEASE MECHANISM FOR BRAKE BEAMS.
APPLICATION FILED AUG. 20, 1917.
1,266,895.
Patented May 21, 1918.
3 SHEETS—SHEET 1.
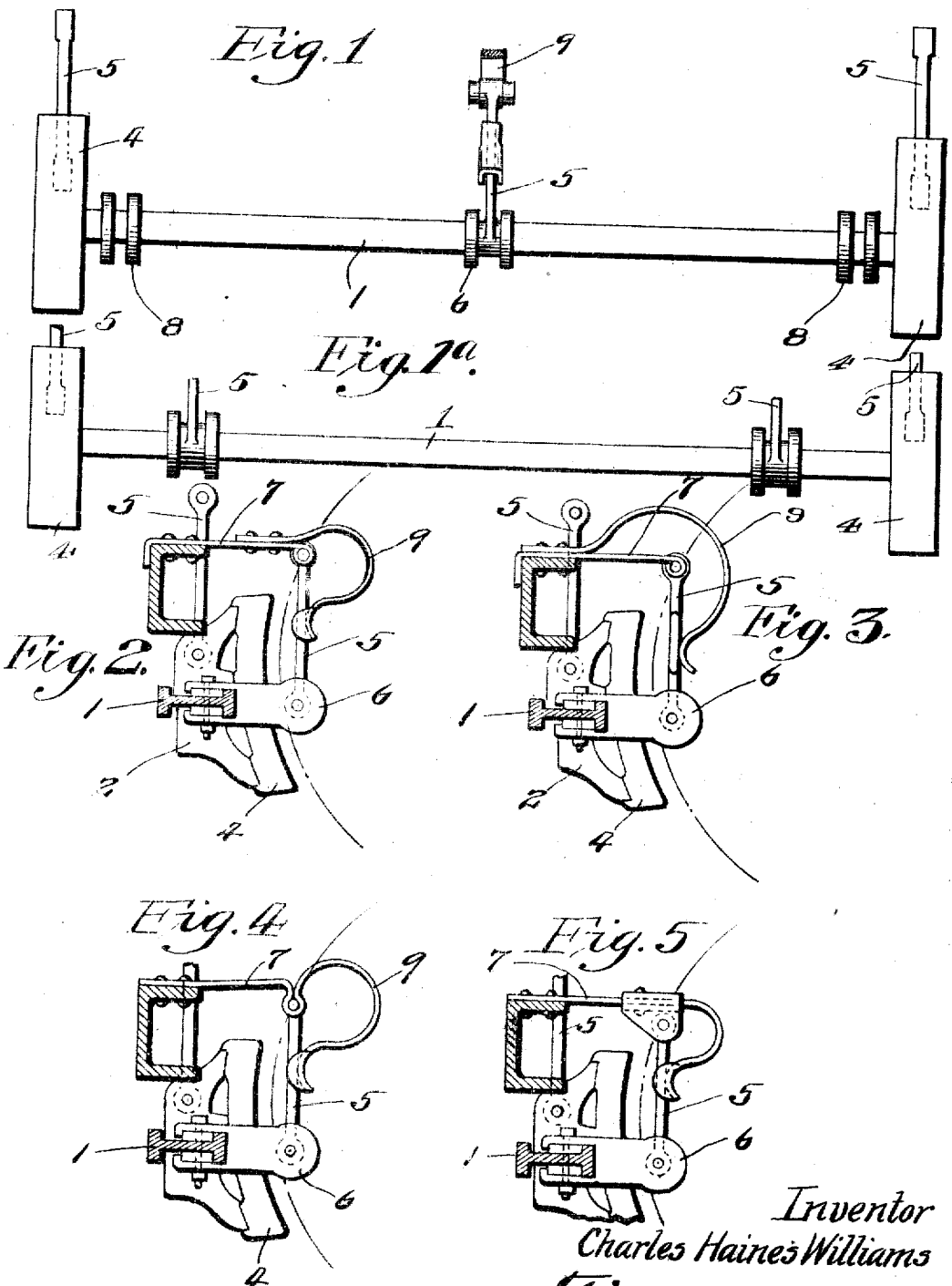
Inventor
Charles Haines Williams

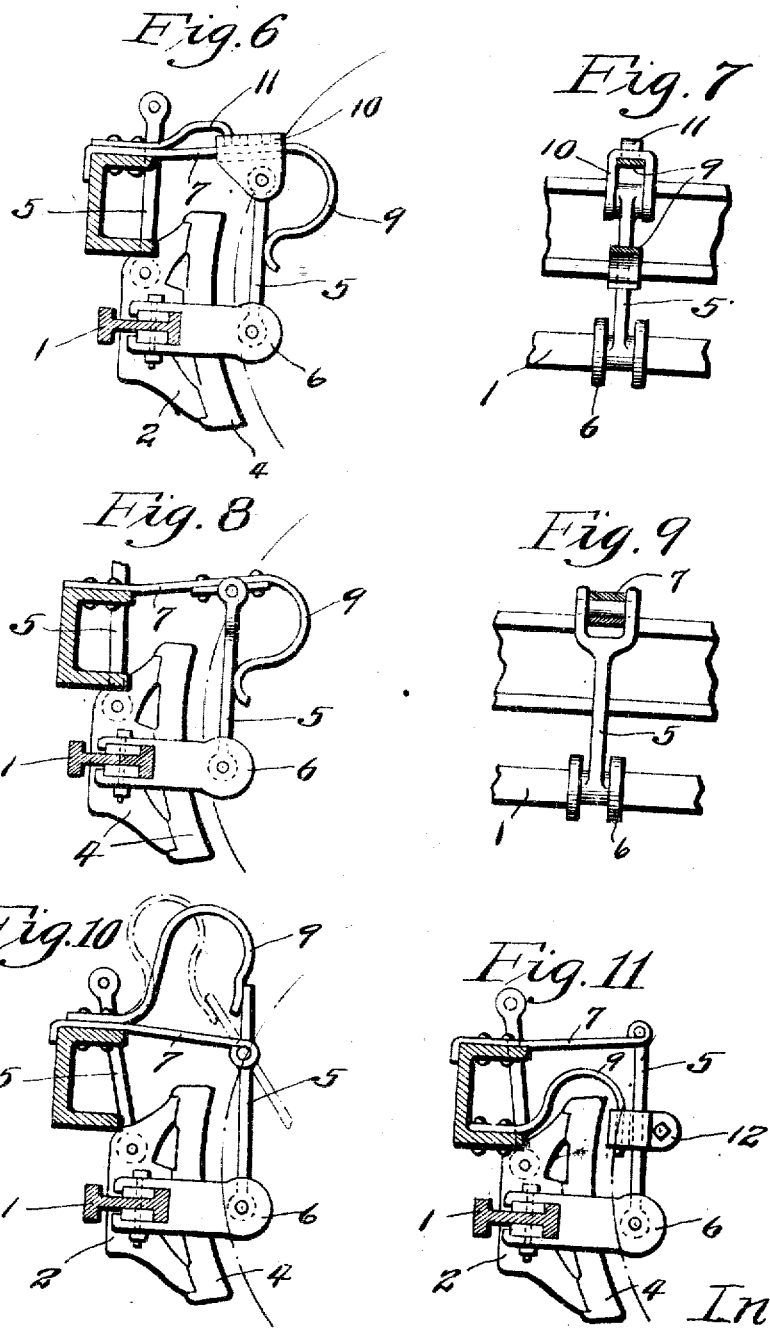

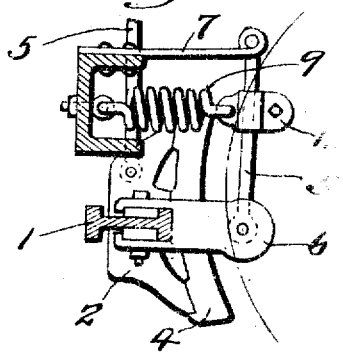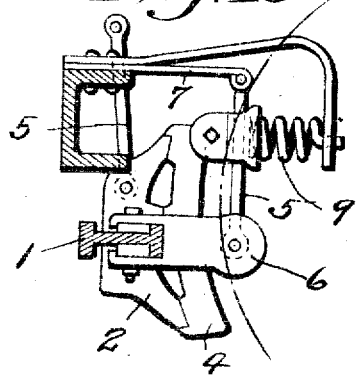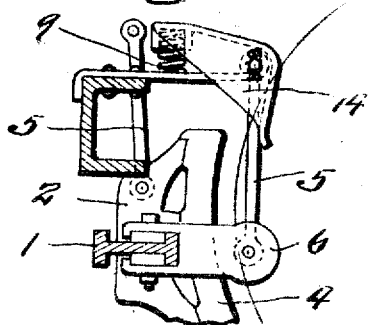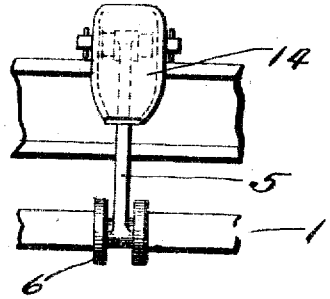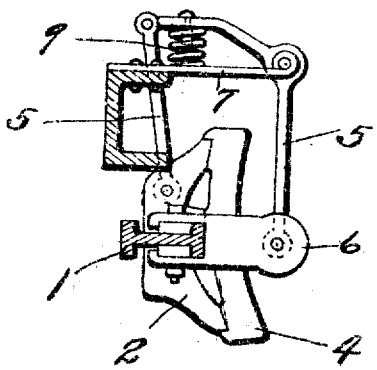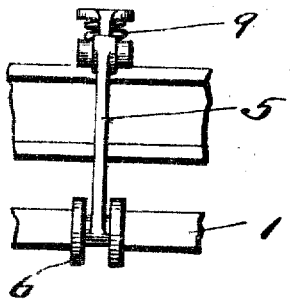

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

RELEASE MECHANISM FOR BRAKE-BEAMS.

1,266,895.

Specification of Letters Patent.

Patented May 21, 1918.

Application filed August 20, 1917. Serial No. 187,105.

*To all whom it may concern:*

Be it known that I, CHARLES HAINES WILLIAMS, a citizen of the United States, residing at Chicago, State of Illinois, have invented a certain new and useful Improvement in Release Mechanism for Brake-Beams, of which the following is a full, clear, and exact description, such as will enable others skilled in the art to which it appertains to make and use the same, reference being had to the accompanying drawings, forming part of this specification.

This invention relates broadly to railway equipment and specifically to certain improvements in the mechanism which operates to release or cast-off the brakes from frictional engagement with the wheels upon release of the operating pressure.

Various means have been employed heretofore for the purpose of retracting the brake beam so as to throw off the brake shoes from braking engagement with the wheels, such arrangements having comprised some form of spring adapted for coöperation with the brake beam in such disposal that the movement of the beam upon the application of the brakes would place the spring under stress and store up energy which, upon release of the operating pressure, would react to throw off the brakes. It is well known experience, that both the brake shoes and treads of the wheels, due to wear and re-shaping, become considerably reduced in size from their original dimensions so that a considerably greater extent of movement is required of the brake beam in order to effect application of the brakes than is the case when the shoes and wheels are new. This increased extent of movement of the beam necessarily increases the extent of flection of the release springs which coöperate with the beam. As a result of this increased extent of flection of the release springs, and the consequent increase in resistance which they offer to the application of the brakes, the movement of the brake beam is frequently rendered inaccurate, and undue load thrown upon the power transmitting members of the brake operating mechanism.

The broad purpose of my present invention is to provide an arrangement whereby the extent of flection required of the cast-off springs in the application of the brakes is greatly reduced, and the difference in the amount of flection between minimum and maximum throw of the brake beam is so inconsequential as not to effectively vary the amount of resistance offered to the movement of the brake beam between its minimum operative movement and its maximum operative movement.

A further object of my invention is to provide an arrangement of release springs whereby the desirable flexibility of the guide supports, commonly known as the third or fourth point support, is maintained, so as to afford the proper guidance of the brake shoes, yet permit their accommodation to the wheels upon wear or reduction of the shoes and of the diameter of the wheels.

A further object of my invention is to provide an arrangement wherein the disposal of the release springs is such as to insure their maximum effectiveness and to render their action more immediate and positive.

Other and further objects of the invention will be obvious or pointed out hereinafter, reference being had to the accompanying drawings illustrating several forms in which the invention may be embodied and in which Figure 1 represents a front elevational view of a brake beam showing several possible disposals of my invention.

Fig. 1ᵃ is a modified form of hanger arrangement.

Fig. 2 illustrates a side elevation of the arrangement shown in Fig. 1, the bar member of the brake beam being shown in section.

Fig. 3 illustrates a similar side elevation of a modified form.

Fig. 4 illustrates a similar side elevation of a second modified form.

Fig. 5 is a view similar to Fig. 4 of a third modified form.

Fig. 6 is a similar view of a fourth modified form.

Fig. 7 is a front elevation partly in section of the form shown in Fig. 6.

Fig. 8 is a side elevational view of a fifth modified form.

Fig. 9 is a front elevation partly in section of the form shown in Fig. 8.

Fig. 10 is a side elevation of a sixth modified form.

Fig. 11 is a similar view of a seventh modified form.

Fig. 12 is a similar view of an eighth modified form.

Fig. 13 is a similar view of a ninth modified form.

Fig. 14 is a similar view of a tenth modified form.

Fig. 15 is a front elevational view of the form illustrated in Fig. 14.

Fig. 16 is a side elevational view of an eleventh modified form, and

Fig. 17 is a front elevational view of the form illustrated in Fig. 16.

While these forms are here shown as illustrative of the invention, and show a number of ways in which it may be embodied, I am aware that it is not limited simply to these embodiments, but may be incorporated in a great variety of others with different disposals of the essential members.

Referring to these illustrations by the reference numerals applied, let it be understood that the character 1 designates the beam or bar member of the brake beam, it being illustrated here as an I beam having its extremities suitably formed for the mounting of the brake heads 2. The heads carry the shoes 4 in conventional fashion, which shoes are arranged for coöperation with the treads of the associated wheels. The brake beam is supported from portions of the truck frame in any desired fashion such as will permit its necessary movement toward and from the wheels to effect application and removal of the shoes from the tires of the wheels. In the several forms illustrated, this movable supporting means for the brake beam comprises the hangers 5, certain of which may be connected to the brake heads 2 and other of which may be connected to brackets 6 which extend forwardly from the beam member 1. The hangers which are connected to the bracket members 6 are supported by flexible members 7 so that the brake beam may be accorded the proper rotative movement to accommodate the shoes to the wheel treads. The brackets 6 may be disposed one adjacent each extremity of the brake beam, as illustrated in Fig. 1ª, or one at the longitudinal center of the beam as illustrated in Fig. 1.

It will be readily understood by one skilled in the art that the connections of the hangers 5 to portions of the brake beam and to the supporting truck portions are flexible or pivotal, so as to permit a swinging or oscillatory movement of the beam. Suitable provision for connection of power transmitting members to the beam is made by means of the brackets 8, whereby tractive effort may be exerted upon the beam to move the brake shoes into coöperation with the wheel treads. The normal position of the beam, of course, is such that the brake shoes are out of contact with the treads of the wheels. To retain the beam in this position when the operating power is off, and to move it to this position upon release of the operating power after application of the brakes, I provide a cast-off spring 9 which is suitably supported from a truck portion for effective coöperation with a hanger 5 in such relationship that movement of the brake beam toward the wheels will operate to place the spring under stress so that its reaction is directed upon the hanger in such direction as to tend to move the brake beam away from the wheels. The point of coöperation between the spring and the hanger is considerably closer to the point of support of the latter than is the beam member 1. Consequently, the actual extent of movement of the hanger at its point of coöperation with the release spring is considerably less than the actual extent of movement of the beam member 1. By virtue of this disposal, the degree of flection of the release spring in the operation of the beam for the application of the brakes is comparatively small, and the amount of variation in such flection between that necessary in a minimum braking movement of the brake beam and a maximum braking movement of the brake beam is inconsequential. As a result the amount of resistance offered by the release spring to the braking movement of the beam will have no perceptible variation so that, even when the brake shoes and the wheel treads are worn to the maximum perceptible degree, the release spring will not occasion an undesirable variation or any inaccuracy in the movement of the brake beam.

With this disposal of the release springs, moreover, no great variation in the length of said springs is required when the brake beams are disposed at different distances from the supporting truck portions, as the point of engagement between the release springs and the hanger may remain the same with respect to the point of attachment of the springs to the truck.

It is believed that each of the several forms illustrated is obvious both as to construction and operation from the foregoing.

In the form illustrated in Fig. 2, the release spring is attached to the flexible supporting member 7. In the forms shown in Figs. 4, 5, 6, and 8, the release spring is formed as a continuation of the flexible supporting member. In the form illustrated in Fig. 3, the release spring is attached directly to the truck portion. In the form illustrated in Figs. 6 and 7, the sliding bracket member 10 is carried on the flexible supporting member 7, so that it may be adjusted toward and from the spring 9, the bracket being retained in adjustable position by the catch 11. In the form illustrated in Fig. 10, the hanger is in the form of a second class lever, and the release spring 9 coöperates with its power arm. In the form illustrated in Fig. 11, the release spring 9 is operably connected to the hanger 5 by a clip 12, the spring being arranged behind the hanger. In the forms illustrated in Figs. 12 and 13, coiled release springs are employed, that illustrated in Fig. 12 being placed under tension upon application of the brakes, and that illustrated in Fig. 13 being placed under compression. Both are connected to the hangers by clips 12 which are vertically adjustable upon the latter. In the form illustrated in Figs. 14 and 15, a lever member 14 is fulcrumed coaxially with the connecting pin of the hanger 5, one arm of said lever member being disposed in coöperation with the hanger and the other being associated with the release spring 9. In the forms illustrated in Figs. 16 and 17, an angular extension is formed at the upper extremity of the hanger 5 so that it forms a bell crank lever with the release spring 9 coöperating with the power arm.

In each of these several forms, it will be observed that the arrangement is such as to maintain the desired coöperation between the release spring and the hanger while permitting the desired flexible movement of the hanger when it is one of the forward third or fourth point supports. Of course, when the release spring is arranged in coöperation with a hanger which is not used as one of the third or fourth point supports, it is not necessary that the release spring have this accommodation.

It will be observed from the foregoing that this arrangement of parts greatly shortens the release spring, decreases the amount of material required, greatly decreases the extent of movement of the parts, and results in a more uniform operation of the beam upon the application of the brakes under variation in size of the shoes and wheels, and a more immediate, uniform and positive operation in the throwing off of the brakes from the wheels.

The appended claims are intended to comprehend the invention in its broadest scope and to include all variations and modifications properly within its spirit though not specifically illustrated and described herein.

What I claim is:

1. In a truck, a brake beam disposed for coöperation with the wheels, a hanger having oscillatory connection with a truck portion and with the brake beam to afford support for the latter upon the former, and to permit operative movement of the brake beam, and a spring mounted on a truck portion and having effective coöperation with the hanger at a point between its connection to the truck and the beam to oppose movement of the brake beam for application of the brakes.

2. In a truck, the combination of a brake beam arranged for coöperation with the wheels, hangers having oscillatory connection with the brake beam and with truck portions to movably support the former upon the latter, and a spring supported on a truck portion and having effective coöperation with a hanger short of the point of connection of the hanger to the beam.

3. In a truck, the combination of a brake beam disposed for coöperation with the wheels, hangers connected to the beam and to truck portions to support the former for oscillatory movement, and a spring carried by a truck portion and having coöperation with the hanger to exert leverage upon the brake beam through the hanger.

4. In a truck, the combination of a brake beam disposed for coöperation with the wheels, a hanger flexibly supported on a truck portion and having connection with the beam to afford a support for the same, and a spring effective upon the hanger to move the beam, said spring being disposed to accommodate the flexible movement of the hanger.

5. In a truck, the combination of a brake beam disposed for coöperation with the wheels, a hanger having operative connection with the beam to provide a support therefor, said hanger being supported on a truck portion for both oscillatory and bodily movement relative thereto, and a spring having coöperation with the hanger to oppose oscillatory movement thereof, said spring being disposed to accommodate the bodily movement of the hanger.

6. In a truck, the combination of a brake beam disposed for coöperation with the wheels, a hanger having oscillatory connection with the beam, a spring coöperating with the hanger to oppose movement of the beam, and means whereby the hanger is connected to a truck portion to support the beam, said means being adjustable to permit variation of the point of support of the hanger relative to the spring.

7. In a truck, the combination of a brake beam movably mounted and having brake heads disposed for coöperation with the wheels, a hanger associated with the beam intermediate the heads to guide the same in braking movements, and a spring mounted on a truck portion and having effective coöperation with the hanger above the beam to oppose movement of the beam for application of the brakes.

8. In a truck, the combination of a brake beam movably mounted and supporting brake heads disposed for coöperation with the wheels, a hanger mounted on a truck portion and associated with the beam intermediate the heads to afford a guide therefor in braking movements and a spring having coöperation with the hanger intermediate its points of connection to the truck and the beam in such disposal as to be placed under stress in movement of the beam for application of the brakes.

9. In a truck, the combination of a brake beam movably mounted and supporting brake heads at its extremities for coöperation with the wheels, hangers associated with the beam adjacent the respective heads to afford guides therefor in braking movements of the beam, said hangers being operably connected to truck portions; and springs mounted on truck portions and coöperating with the hangers intermediate their extremities for the purpose described.

10. In a truck, the combination of a beam movably mounted on the truck for coöperation with the wheels, a hanger mounted on a truck portion and having connection with the beam to form a third or fourth point support for guidance of the beam in oscillatory movement thereof, and a spring coöperating with said hanger at a point spaced apart from the beam for the purpose described.

In testimony whereof I hereunto affix my signature in the presence of two witnesses, this seventh day of August, 1917.

CHARLES HAINES WILLIAMS.

Witnesses:
E. T. WALKER,
F. T. PHELPS.